UNITED STATES PATENT OFFICE.

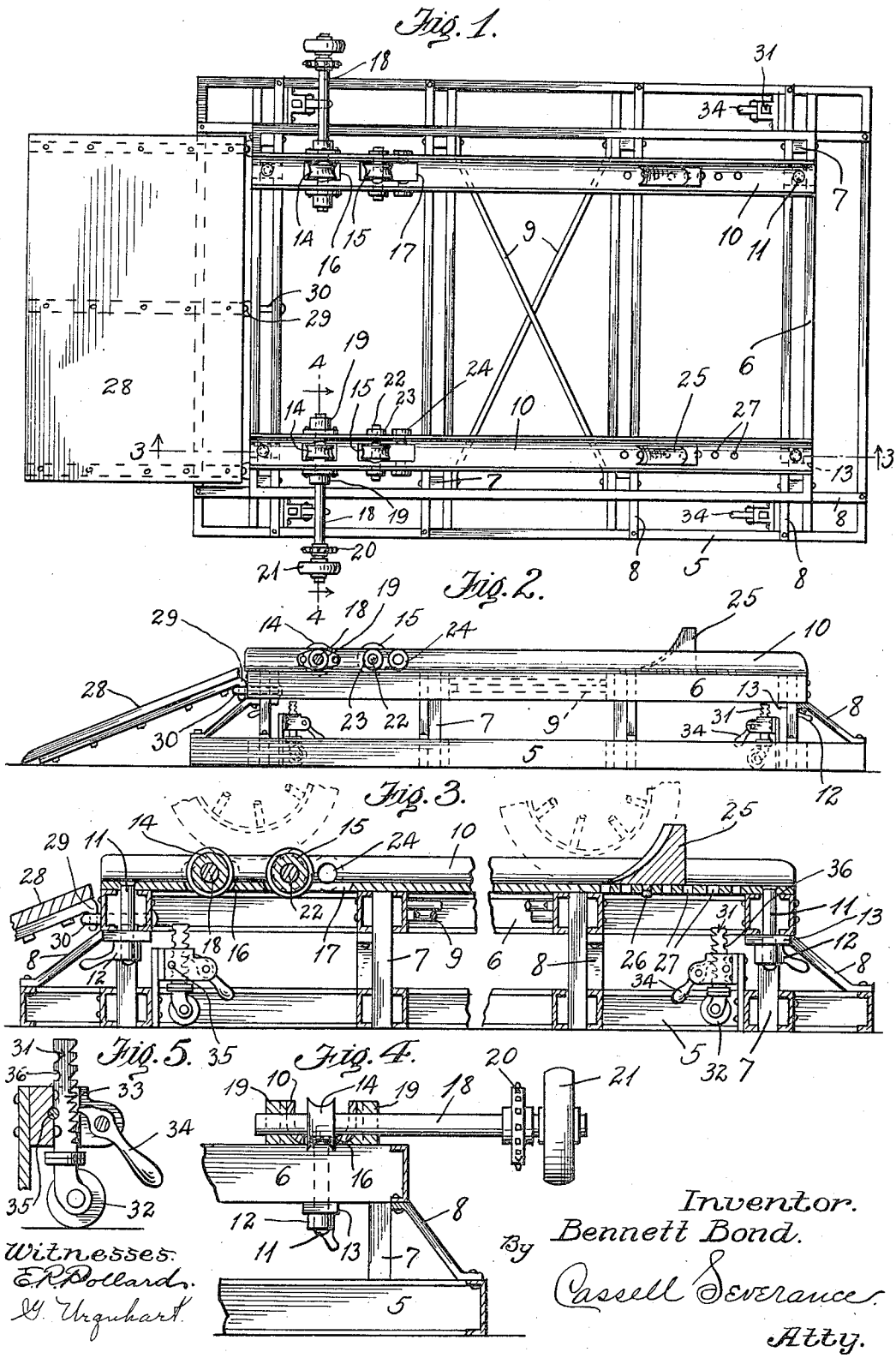

BENNETT BOND, OF LOS ANGELES, CALIFORNIA.

VEHICLE DEMONSTRATING AND TESTING DEVICE.

1,155,126.   Specification of Letters Patent.   Patented Sept. 28, 1915.

Application filed July 5, 1913. Serial No. 777,438.

*To all whom it may concern:*

Be it known that I, BENNETT BOND, a citizen of the United States, residing at Los Angeles, in the county of Los Angeles and State of California, have invented certain new and useful Improvements in Vehicle Demonstrating and Testing Devices, of which the following is a specification.

This invention relates to improvements in vehicle demonstrating and testing devices and it is an object of the invention to provide a support upon which a vehicle such as an automobile may be placed and its operations, speed and horse power be shown, especially to a prospective purchaser.

It is also an object of the invention to provide a support having guide ways thereon for receiving the wheels of a vehicle, movable means being provided for engaging and supporting the drive wheels of said vehicle whereby the mechanism of a motor driven vehicle may be put through its various operations for demonstration and testing purposes without having to take the car out of the garage.

It is a still further object of the invention to provide a portable vehicle support or stand which may be moved about in a garage or other place and which is provided with troughs to receive and guide the wheels of a vehicle, preferably of a motor driven type, pulleys or rollers being provided in said troughs for engaging the drive wheels of the vehicle, the device also having means for connecting speed indicators and power indicating devices to one or more of said pulleys for demonstrating the capabilities of the vehicle.

With these and other objects in view the invention comprises certain novel constructions, combinations and arrangements of parts as will be hereinafter fully described and claimed.

In the accompanying drawing forming a part of this specification: Figure 1 is a top plan view of a vehicle demonstration and testing device constructed in accordance with this invention. Fig. 2 is a side elevation of the same. Fig. 3 is a vertical longitudinal sectional view taken upon the line 3—3 of Fig. 1, but showing the parts upon an enlarged scale, the central portion of the mechanism being broken away. Fig. 4 is a detail sectional view upon an enlarged scale, taken upon the line 4—4 of Fig. 1. Fig. 5 is a detail sectional view through one of the jack mechanisms employed and showing the same upon an enlarged scale.

The improved vehicle demonstrating and testing mechanism forming the subject matter of the present invention is particularly designed to supply a vehicle stand or platform, especially for automobiles or motor driven vehicles, for the purpose of demonstration and giving instruction with regard to the same, without taking a car from the garage or sales room. It affords a means by which a salesman can show the possibilities of a car as to speed and horse power to a prospective purchaser. Such a party can also be allowed to personally operate the car without any chance of damaging the same. Further the purchaser of a car can buy the particular car that has been demonstrated to him and if he is not familiar with the running and care of an automobile he can be taught as to the construction and operation of the same without having to take lessons upon the streets and highways.

The details and features of the invention will now be specifically described, reference being had to the accompanying drawing in which the preferred form of the invention has been disclosed and in which 5 indicates the base portion of the stand or frame and 6 the upper frame of said stand. The base and upper portions may be made of structural iron or any other material and the upper frame 6 is mounted upon standards 7 and is thoroughly and strongly braced against end or side strains by means of inclined braces 8. Horizontally arranged diagonal brace rods 9 may also be used to further stiffen and strengthen the stand.

Supported by the upper frame 6 are longitudinally arranged guide ways 10 which are preferably trough shaped in cross section and extend from end to end upon said upper frame 6. The transverse bars of the upper frame 6 are preferably arranged in pairs with spaces between them and securing bolts 11 carried by the ends of the guide ways 10 project into said spaces. Nuts 12 are applied upon the lower ends of said bolts and bear upon washers 13 interposed between them and the lower edges of said cross bars, whereby the guide ways may be clamped in any position to which they may be brought upon the upper frame. The guide ways 10 may thus be adjusted with respect to each other for receiving vehicles of different widths or whose wheels are spaced apart different distances.

At suitable points near one end of the stand rollers 14 and 15 are journaled, openings 16 and 17 being provided in the said guide ways for accommodating the same. The said rollers are preferably formed with concave peripheries adapted to fit the tire or tread portion of an automobile or vehicle wheel. The rollers 14 are preferably carried by shafts 18 which are journaled in bearings 19 formed in the guideways as clearly shown in Figs. 1 and 4 of the drawing. These shafts 18 project outwardly over the sides of the frame, a sufficient distance to receive movement communicating means. Thus as shown in Figs. 1 and 4 a sprocket wheel 20 and a pulley 21 may be secured to each of the said shafts 18. The said sprocket wheel may be connected with a power testing device of any desired type for indicating the power which may be developed by the motor vehicle operated upon the stand. The pulley 21 may be connected with a speed indicating mechanism of any desired type for showing the speed of which the vehicle is capable. It will be evident that the shafting 18 may be thus connected with any mechanism which it is desired to operate, by any of the usual and well known means, commonly employed for transmitting motion from a shaft, without departing from the spirit of the invention. The rollers 15 are also provided with shafts 22 which engage bearings 23, in the side walls of the guide ways 10. The relation of the pulleys 14 and 15 to each other, is such, that a vehicle wheel may rest upon them and thus be movably supported above the bottom of the guide way as indicated in dotted lines in Fig. 3.

In order to properly fit and accommodate wheels of different diameters, one or both of the rollers 14 and 15 may be adjustably arranged in any desired manner within the guide ways so that they may be spaced to different distances with respect to each other. Thus as shown in Figs. 1, 2 and 3, the shaft 22 of the rollers 15 may be journaled in different bearings as for instance the bearings 24, the length of the slot 17 permitting of such a change. It will be understood that any other means desired for regulating the distance between the rollers 14 and 15 may be employed within the spirit of the invention.

The front wheels of the vehicle are preferably stopped and held in stationary position after the vehicle has been run into the guide ways 10 by means of stop blocks 25 adapted to be set in said guide ways. Such stop blocks are adjustably secured in the guide ways so as to accommodate themselves to different lengths of vehicles. One simple mode of adjustably holding the blocks 25 in place has been illustrated in the drawing. Each block is provided with a downwardly projecting stud 26 adapted to engage any one of a series of apertures 27 formed in the floors of the guide ways 10. The stop blocks may thus be readily set in position for receiving any length of automobile or vehicle and will by engaging the front wheels thereof positively hold and steady the vehicle in place, while the rear or driving wheels thereof are running upon the rollers 14 and 15.

Where the stand or frame rests upon the floor or ground, an incline platform 28 is provided for leading the vehicle to the guide ways, the lower end of said platform resting upon the floor or ground while the upper end is provided with hooks 29 which engage and are supported by eye bolts 30 secured to the framing of the stand. A vehicle may thus be readily run upwardly upon said platform 28 to the guide ways or troughs 10, for demonstration or testing. It should be understood also that the frame of the stand may be set in a depression or pit so that its upper surface will be approximately flush with the floor or ground, without departing at least from the spirit or scope of the invention.

In using such a stand or frame in a garage or sales room it is frequently desirable to move it from place to place and for this purpose the device is preferably made portable. One means of accomplishing this result is shown in the drawing where 31 indicates jacks whose frames are connected with a portion of the base frame of the stand. The said jacks carry casters or rollers 32 upon which the stand may be supported. The said jacks may be of the ordinary or usual type. Thus as shown in the drawing ratchet standards 33 may be provided, the ratchet teeth of which may be engaged by the noses of the lifting levers 34. A lock pin 35 is provided with such a structure and arranged to engage notches 36 formed in the standards 33. It will be readily understood that by operating the jack lifting levers 34, the stand may be raised so as to rest upon the casters 32 after which it may easily be moved to any new or desired position. By lowering the same so that the base rests upon the floor again the stand will be firmly located for receiving the weight of a vehicle and for permitting of its demonstration and testing thereon.

The mechanism of the above described stand is admirably adapted for the demonstrating of the abilities of a car and using the same for endurance tests and positively showing the speed and horse power as well as the cost of oil and gasolene for running the car a given distance, and all without risk of damage to the car and without taking the same from the sales room, garage or other place where it may be kept. The frame as illustrated also elevates the car or other vehicle sufficiently above the floor to afford a ready access to and examination of the under parts of the car or vehicle and thus to a certain extent may be made to take the place of a pit. The frame however, may be placed over a pit, if desired where it is wished to obtain still greater working room beneath the car. Where the support is used in a private garage it may also be utilized as a turn table if desired by raising the frame upon the casters and turning it about.

In addition to connecting the sprocket wheel 20 and pulley 21 with speedometers and power testing devices, it will be readily understood that the power driven vehicle or automobile may be caused to operate machinery and such devices and implements as might be used upon farms, by connecting the shafts 18 or the pulleys or the sprocket wheels thereon with whatever it is desired to operate. Thus churns, cream separators, husking machinery, electric lighting plants, small mills or other devices might be operated by mounting the vehicle upon the stand and driving the rear wheels upon the rollers 14 and 15, all within the scope of the invention.

What is claimed is:

1. A demonstrating device for motor driven vehicles having guide troughs thereon for receiving and holding the wheels of a vehicle, a roller in each guide trough adapted to engage the driven wheels of a vehicle, the said troughs directing the said wheels to the said rollers, shafting driven by said rollers and means carried by said shafting for driving speed and power indicating devices.

2. A demonstrating device for motor driven vehicles comprising a stand having wheel guiding supports thereon, means for adjustably holding said wheel guiding supports with respect to each other, locking pieces for limiting the movement of the wheels in said wheel guiding supports and rollers for engaging the power actuated wheels of the vehicle whereby the capabilities of the vehicle may be demonstrated and tested, said rollers also limiting the movement of the vehicle on the stand.

3. A demonstrating and testing stand for automobiles comprising a frame, adjustable wheel receiving troughs mounted thereon, stop blocks, adjustably mounted in said troughs, wheel supporting rollers adjustably mounted in said troughs and shafting driven by some of said rollers whereby the action of the automobile may be demonstrated.

In testimony whereof, I have hereunto set my hand, in presence of two witnesses.

BENNETT BOND.

Witnesses:
 CASSELL SEVERANCE,
 LILLIE VOLLMER.